US006761133B1

(12) United States Patent
Gearhart

(10) Patent No.: US 6,761,133 B1
(45) Date of Patent: Jul. 13, 2004

(54) AQUARIUM DEVICE

(76) Inventor: Stephen D. Gearhart, 1695 S. Crystal Cove, Haslett, MI (US) 48840

(*) Notice: Subject to any disclaimer, the term of this patent is extended or adjusted under 35 U.S.C. 154(b) by 0 days.

(21) Appl. No.: 10/436,468

(22) Filed: May 12, 2003

(51) Int. Cl.[7] .............................................. A01K 63/00
(52) U.S. Cl. ...................... 119/269; 119/245; 210/169
(58) Field of Search ................................ 119/245, 259, 119/269, 246, 247, 253, 264; D30/101

(56) References Cited

U.S. PATENT DOCUMENTS

| 460,809 A | | 10/1891 | Gunther | |
|---|---|---|---|---|
| 3,827,560 A | * | 8/1974 | Morton | 210/169 |
| D244,622 S | * | 6/1977 | Braid | D30/101 |
| 4,098,230 A | | 7/1978 | Jackson | |
| 4,147,131 A | * | 4/1979 | Walker | 119/246 |
| 4,944,248 A | | 7/1990 | Torng | |
| D361,167 S | | 8/1995 | Ichikawa | |
| D371,088 S | * | 6/1996 | Vollick | D11/145 |
| 5,690,054 A | | 11/1997 | Allen | |
| 5,783,070 A | * | 7/1998 | Lee | 210/169 |
| 5,849,185 A | | 12/1998 | Judy, Jr. | |
| 6,234,113 B1 | * | 5/2001 | Dor | 119/259 |

* cited by examiner

Primary Examiner—Michael J. Carone
Assistant Examiner—Elizabeth Shaw

(57) ABSTRACT

An aquarium device for draining and cleaning an aquarium. The aquarium device includes a base having a top side, a bottom side, a first side, a second side, a third side and a fourth side. The top side has a depression therein. A peripheral edge of the depression has a slot therein. A valve selectively opens and closes to facilitate draining water. A substantially rigid panel having slots therethrough has a size and shape substantially equal to the peripheral edge of the depression. The panel may abut the peripheral edge and generally cover the depression. A housing has a top and bottom open end. The bottom end has an edge extendable into the slot such that a generally watertight seal is defined. The housing comprises a substantially transparent material.

8 Claims, 3 Drawing Sheets

AQUARIUM DEVICE

BACKGROUND OF THE INVENTION

1. Field of the Invention

The present invention relates to aquariums and more particularly pertains to a new aquarium device for draining and cleaning an aquarium.

2. Description of the Prior Art

The use of aquariums is known in the prior art. More specifically, aquariums heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,849,185; U.S. Pat. No. 4,098,230; U.S. Pat. No. 5,690,054; U.S. Pat. No. 4,944,248; U.S. Pat. No. 460,809; and U.S. Des. Pat. No. 361,167.

While these devices fulfill their respective, particular objectives and requirements, the aforementioned patents do not disclose a new aquarium device. The inventive device includes a base having a top side, a bottom side, a first side, a second side, a third side and a fourth side wherein the first and second sides are oppositely positioned with respect to each other. The top side has a depression therein. A peripheral edge of the depression has a slot therein extending around the depression. A valve to let water out of the tank. A substantially rigid panel has a size and shape substantially equal to the peripheral edge of the depression. The panel may abut the peripheral edge and generally cover the depression. The panel has a plurality of rows of slots extending therethrough. A housing has a top and bottom open end. The bottom end has an edge having size and shape substantially equal to the size and shape of the slot such that a bottom edge of the housing is extendable into the slot and a generally watertight seal is defined. The housing comprises a substantially transparent material.

In these respects, the aquarium device according to the present invention substantially departs from the conventional concepts and designs of the prior art, and in so doing provides an apparatus primarily developed for the purpose of draining and cleaning an aquarium.

SUMMARY OF THE INVENTION

In view of the foregoing disadvantages inherent in the known types of aquariums now present in the prior art, the present invention provides a new aquarium device construction wherein the same can be utilized for draining and cleaning an aquarium.

The general purpose of the present invention, which will be described subsequently in greater detail, is to provide a new aquarium device apparatus and method which has many of the advantages of the aquariums mentioned heretofore and many novel features that result in a new aquarium device which is not anticipated, rendered obvious, suggested, or even implied by any of the prior art aquariums, either alone or in any combination thereof.

To attain this, the present invention generally comprises a base having a top side, a bottom side, a first side, a second side, a third side and a fourth side wherein the first and second sides are oppositely positioned with respect to each other. The top side has a depression therein. A peripheral edge of the depression has a slot therein extending around the depression. A valve for selectively opening and closing is used to drain the water. A substantially rigid panel has a size and shape substantially equal to the peripheral edge of the depression. The panel may abut the peripheral edge and generally cover the depression. The panel has a plurality of rows of slots extending therethrough. A housing has a top and bottom open end. The bottom end has an edge having size and shape substantially equal to the size and shape of the slot such that a bottom edge of the housing is extendable into the slot and a generally watertight seal is defined. The housing comprises a substantially transparent material.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new aquarium device apparatus and method which has many of the advantages of the aquariums mentioned heretofore and many novel features that result in a new aquarium device which is not anticipated, rendered obvious, suggested, or even implied by any of the prior art aquariums, either alone or in any combination thereof.

It is another object of the present invention to provide a new aquarium device which may be easily and efficiently manufactured and marketed.

It is a further object of the present invention to provide a new aquarium device which is of a durable and reliable construction.

An even further object of the present invention is to provide a new aquarium device which is susceptible of a low cost of manufacture with regard to both materials and labor, and which accordingly is then susceptible of low prices of sale to the consuming public, thereby making such aquarium device economically available to the buying public.

Still yet another object of the present invention is to provide a new aquarium device which provides in the apparatuses and methods of the prior art some of the advantages thereof, while simultaneously overcoming some of the disadvantages normally associated therewith.

Still another object of the present invention is to provide a new aquarium device for draining and cleaning an aquarium.

Yet another object of the present invention is to provide a new aquarium device which includes a base having a top side, a bottom side, a first side, a second side, a third side and a fourth side wherein the first and second sides are oppositely positioned with respect to each other. The top side has a depression therein. A peripheral edge of the depression has a slot therein extending around the depression. A valve for selectively opening and closing is used to drain the water. A substantially rigid panel has a size and shape substantially equal to the peripheral edge of the depression. The panel may abut the peripheral edge and generally cover the depression. The panel has a plurality of rows of slots extending therethrough. A housing has a top and bottom open end. The bottom end has an edge having size and shape substantially equal to the size and shape of the slot such that a bottom edge of the housing is extendable into the slot and a generally watertight seal is defined. The housing comprises a substantially transparent material.

Still yet another object of the present invention is to provide a new aquarium device that allows a user to drain water and add additional water for cleaning purposes by draining the water through the base of the aquarium without removing the gravel and other items of contained within the aquarium.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
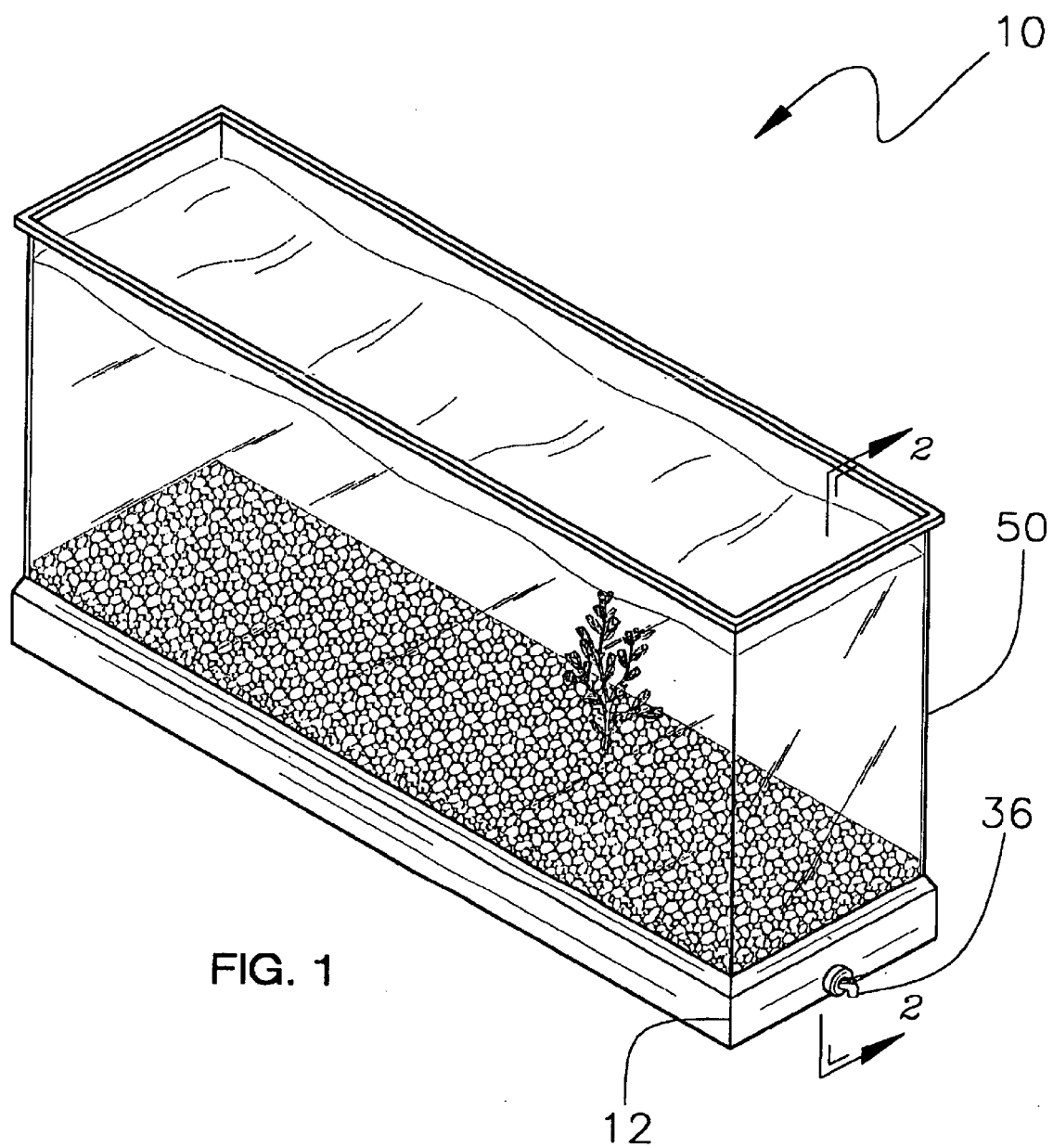
FIG. 1 is a schematic perspective view of a new aquarium device according to the present invention.
Figure 2:
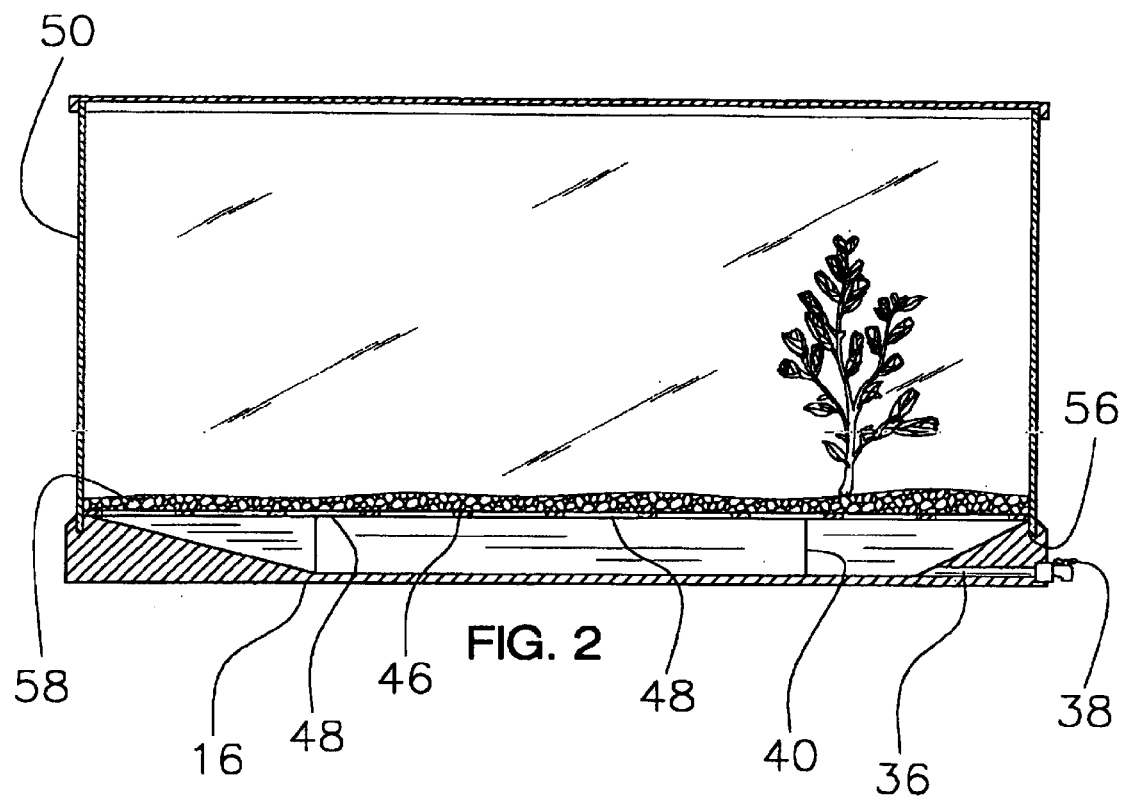
FIG. 2 is a schematic side view of the present invention.
Figure 3:
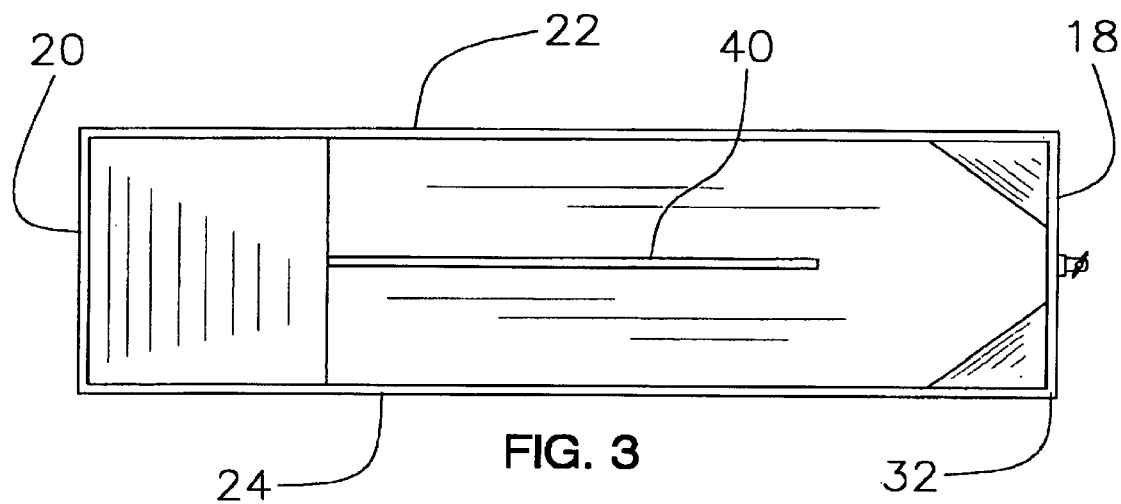
FIG. 3 is a schematic plan view of the base of the present invention.
Figure 4:
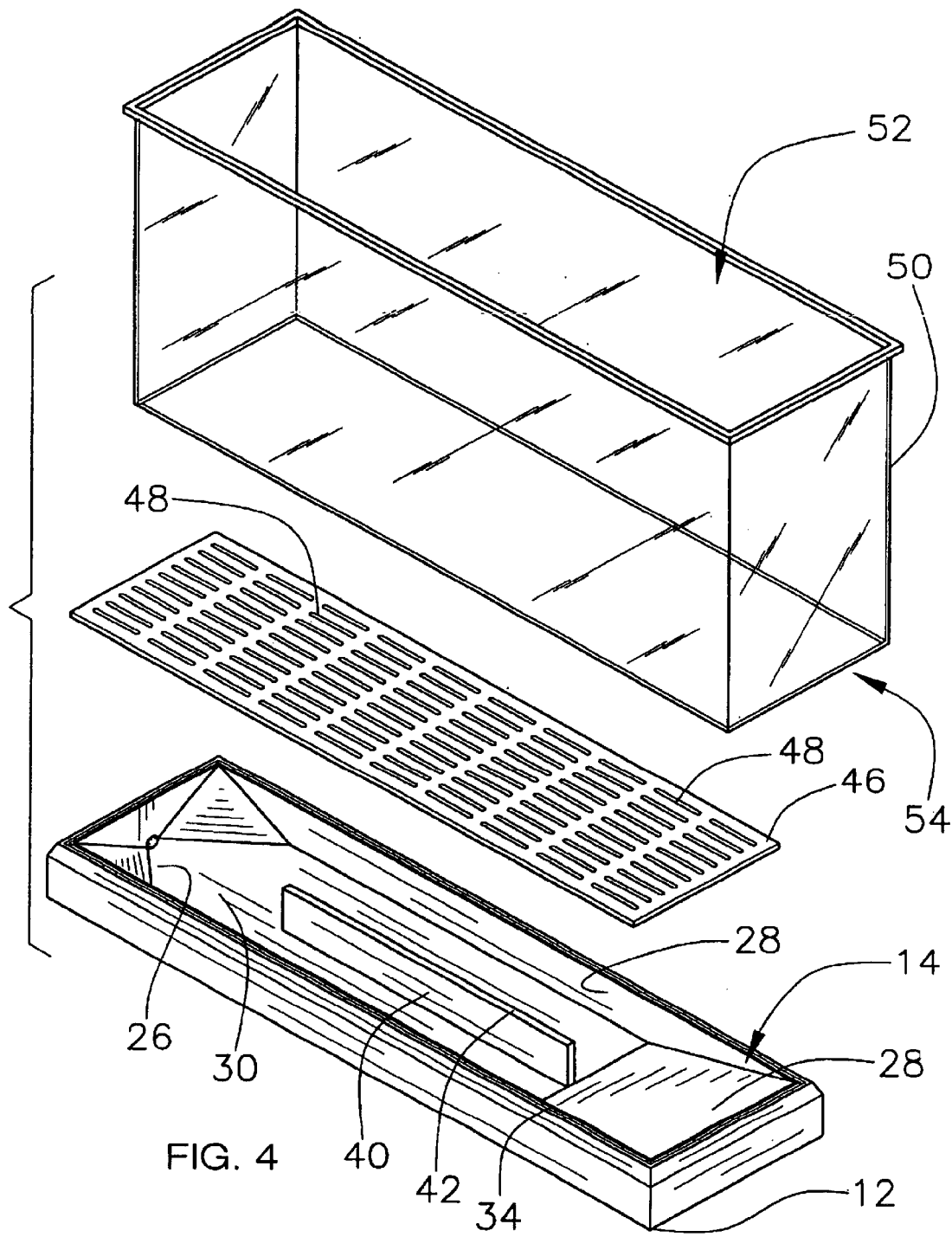
FIG. 4 is a schematic perspective view of the present invention.

With reference now to the drawings, and in particular to FIGS. 1 through 4 thereof, a new aquarium device embodying the principles and concepts of the present invention and generally designated by the reference numeral 10 will be described.

As best illustrated in FIGS. 1 through 4, the aquarium device 10 generally comprises a base 12 having a top side 14, a bottom side 16, a first side 18, a second side 20, a third side 22 and a fourth side 24 wherein the first 18 and second 20 sides are oppositely positioned with respect to each other. The top side 14 has a depression 26 therein. The depression 26 has side walls 28 angled downward toward a central area 30 of the depression 26. The central area 30 of the depression lies in a generally horizontally orientated plane. The central area 30 has a length and width equal to at least ½ a length and width of the base 12. A peripheral edge 32 of the depression 26 has a slot 34 therein extending around the depression 26.

A valve 38 selectively opens and closes to drain the water.

A plate 40 is coupled to and extends upwardly from the central area of the depression 30. The plate 40 is elongated and is orientated generally parallel to the third 22 and fourth 24 sides of the base 12. The plate 40 is positioned generally between the third 22 and fourth 24 sides. The plate 40 has a height such that a top edge 42 of the plate 40 extends to a plane of the peripheral edge 32 of the depression 26. The plate 40 is ideally comprised of a plastic material.

A substantially rigid panel 46 has a size and shape substantially equal to the peripheral edge 32 of the depression 26. The panel 44 may abut the peripheral edge 32 and generally cover the depression 26. The panel 44 has a plurality of rows of slots 46 extending therethrough. Each of the slots 48 has a length preferably between 2 centimeters and 5 centimeters and a width preferably between 2 millimeters and 4 millimeters.

A housing 50 has a top 52 and bottom 54 open end. The bottom end 54 has an edge 56 having size and shape substantially equal to the size and shape of the slot 34 such that a bottom edge 56 of the housing 50 is extendable into the slot 34 and a generally watertight seal is defined. The housing 50 comprises a transparent material. The transparent material ideally comprises a glass material.

In use, the panel 46 is positioned on the peripheral edge 32 of the depression 26 such that the peripheral edge 32 and the plate 40 support the panel, in a horizontal orientation. The angled sides 28 of the depression 26 draw the water toward the tube 36 and prevent the panel 46 from tilting. Gravel 58, rocks or other conventional items are positioned on the panel 46. The aquarium is then filled with water. When a user wants to clean the tank, the valve 38 is opened and water is drained out of the aquarium. The slots 48 allow the water into the depression 26 while the slots 48 prevent the gravel 58 and such from clogging the tube 36. This process is simpler than conventional cleaning methods and places less stress on the fish or other living creatures within the aquarium.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An aquarium device comprising:

a base having a top side, a bottom side, a first side, a second side, a third side and a fourth side wherein said first and second sides are oppositely positioned with respect to each other, said top side having a depression therein, a peripheral edge of said depression having a slot therein extending around said depression;

a valve for selectively opening and closing is used to facilitate draining water;

a substantially rigid panel having a size and shape substantially equal to said peripheral edge of said depression, wherein said panel may abut said peripheral edge and generally cover said depression, said panel having a plurality of rows of slots extending therethrough;

a housing having a top and bottom open end, said bottom end having an edge having size and shape substantially equal to the size and shape of said slot such that a bottom edge of said housing is extendable in said slot and a generally watertight seal is defined, said housing comprising a substantially transparent material;

wherein said depression has side walls being angled downward toward a central area of said depression; and wherein said central area of said depression lies in a generally horizontally orientated plane, said central area having a length and width equal to at least ½ a length and width of said base.

2. The aquarium device as in claim 1, further including a plate being coupled to and extending upwardly from said central area of said depression, said plate being elongated and being orientated generally parallel to said third and fourth sides of said base, said plate having a height such that a top edge of the plate extends to a plane of said peripheral edge of said depression.

3. The aquarium device as in claim 1, further including a plate being coupled to and extending upwardly from said central area of said depression, said plate being elongated and being orientated generally parallel to said third and fourth sides of said base, said plate having a height such that a top edge of the plate extends to a plane of said peripheral edge of said depression.

4. The aquarium device as in claim 1, further including a plate being coupled to and extending upwardly from said depression, said plate being elongated and being orientated generally parallel to said third and fourth sides of said base, said plate having a height such that a top edge of the plate extends to a plane of said peripheral edge of said depression.

5. The aquarium device as in claim 4, wherein said plate is positioned generally between said third and fourth sides.

6. The aquarium device as in claim 5, wherein each of said slots has a length generally between 2 centimeters and 5 centimeters and a width generally between 2 millimeters and 4 millimeters.

7. The aquarium device as in claim 1, wherein each of said slots has a length generally between 2 centimeters and 5 centimeters and a width generally between 2 millimeters and 4 millimeters.

8. An aquarium device comprising:

a base having a top side, a bottom side, a first side, a second side, a third side and a fourth side wherein said first and second sides are oppositely positioned with respect to each other, said top side having a depression therein, said depression having side walls being angled downward toward a central area of said depression, said central area of said depression lying in a generally horizontally orientated plane, said central area having a length and width equal to at least ½ a length and width of said base, a peripheral edge of said depression having a slot therein extending around said depression;

a valve for selectively opening and closing is used to facilitate draining water;

a plate being coupled to and extending upwardly from said central area of said depression, said plate being elongated and being orientated generally parallel to said third and fourth sides of said base, said plate being positioned generally between said third and fourth sides, said plate having a height such that a top edge of the plate extends to a plane of said peripheral edge of said depression;

a substantially rigid panel having a size and shape substantially equal to said peripheral edge of said depression, wherein said panel may abut said peripheral edge and generally cover said depression, said panel having a plurality of rows of slots extending therethrough, each of said slots having a length generally between 2 centimeters and 5 centimeters and a width generally between 2 millimeters and 4 millimeters; and a housing having a top and bottom open end, said bottom end having an edge having size and shape substantially equal to the size and shape of said slot such that a bottom edge of said housing is extendable in said slot and a generally watertight seal is defined, said housing comprising a transparent material, said transparent material comprising a glass material.

* * * * *